United States Patent
Jones et al.

(10) Patent No.: US 9,054,385 B2
(45) Date of Patent: Jun. 9, 2015

(54) PASSIVE POWER MANAGEMENT AND BATTERY CHARGING FOR A HYBRID FUEL CELL / BATTERY SYSTEM

(75) Inventors: Thomas David Jones, Montreal (CA); Seyoung Kim, Brossard (CA)

(73) Assignee: Energyor Technologies, Inc, Ville Saint Laurent QC (CA)

( * ) Notice: Subject to any disclaimer, the term of this patent is extended or adjusted under 35 U.S.C. 154(b) by 813 days.

(21) Appl. No.: 13/185,859

(22) Filed: Jul. 19, 2011

(65) Prior Publication Data

US 2012/0019190 A1    Jan. 26, 2012

Related U.S. Application Data

(60) Provisional application No. 61/400,269, filed on Jul. 26, 2010.

(51) Int. Cl.
| | |
|---|---|
| *H01M 10/44* | (2006.01) |
| *H02J 7/34* | (2006.01) |
| *H01M 10/46* | (2006.01) |
| *H02J 1/06* | (2006.01) |
| *H01M 10/48* | (2006.01) |
| *H02J 1/00* | (2006.01) |
| *H01M 16/00* | (2006.01) |

(52) U.S. Cl.
CPC ............. *H01M 16/00* (2013.01); *H02J 7/34* (2013.01); *H02J 2001/004* (2013.01); *H01M 16/003* (2013.01); *H01M 10/46* (2013.01); *Y02E 60/12* (2013.01); *H02J 1/06* (2013.01); *H01M 10/48* (2013.01); *H01M 10/44* (2013.01)

(58) Field of Classification Search
USPC ........................................................ 320/101
See application file for complete search history.

(56) References Cited

U.S. PATENT DOCUMENTS

| | | | | |
|---|---|---|---|---|
| 6,867,568 B1 * | 3/2005 | Olson et al. | .................... | 320/162 |
| 7,863,865 B2 * | 1/2011 | Hussain et al. | ............... | 320/140 |

* cited by examiner

*Primary Examiner* — Edward Tso
*Assistant Examiner* — Johali Torres Ruiz

(57) ABSTRACT

Disclosed herein is a circuit for passively managing power between a fuel cell stack and a battery in a hybrid system. The circuit includes a buck-boost converter circuit, a direct charge circuit; and a network which interconnects them. The network is configured so that in response to a voltage level in the network being lower than or equal to a maximum battery charge voltage, the battery is charged via the direct charge circuit; and in response to another voltage level in the network which is higher than the maximum battery charge voltage, the battery is charged via the buck-boost converter circuit. Also disclosed is a device incorporating the circuit and a method of passively managing power.

16 Claims, 1 Drawing Sheet

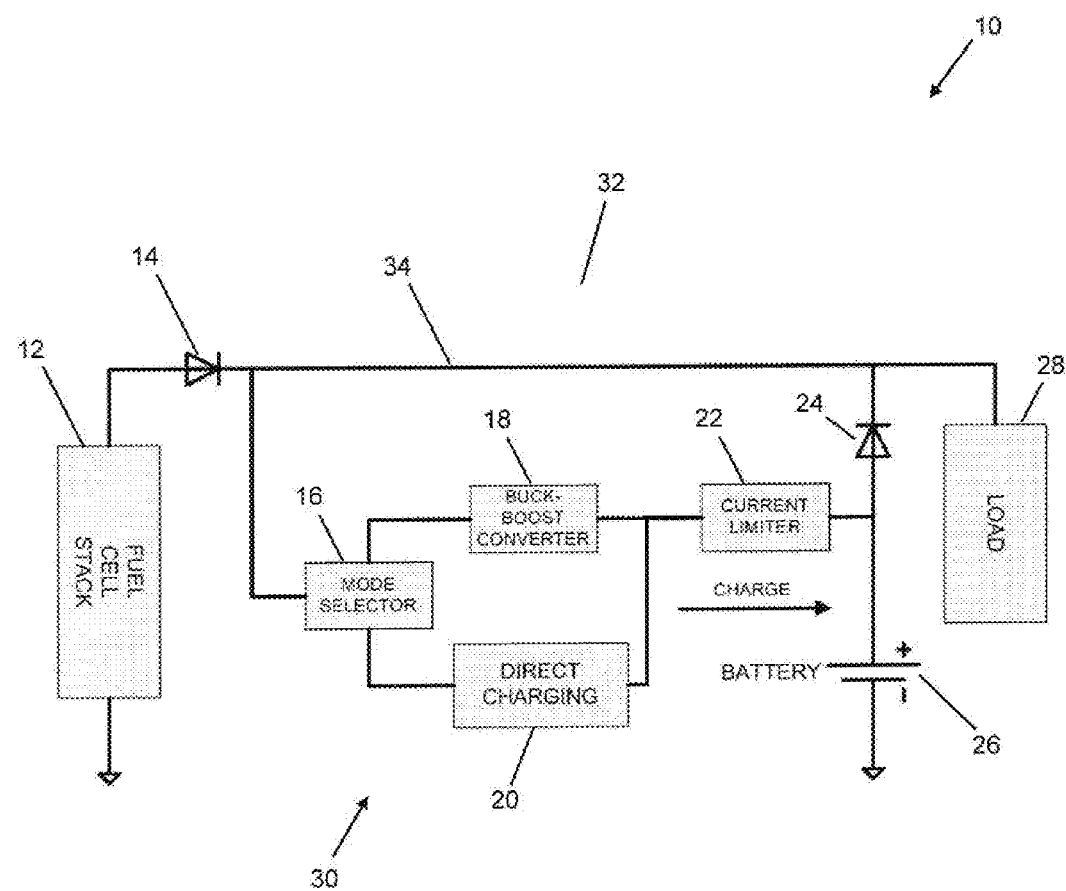

PASSIVE POWER MANAGEMENT AND BATTERY CHARGING FOR A HYBRID FUEL CELL / BATTERY SYSTEM

CROSS-REFERENCE TO RELATED APPLICATIONS

Priority from previously filed U.S. provisional patent application Ser. No. 61/400,269, filed on Jul. 26, 2010, is hereby claimed.

TECHNICAL FIELD

The present generally concerns electrochemical fuel cells and more particularly to passive power management and battery charging for a hybrid fuel cell/battery system.

BACKGROUND

Polymer electrolyte membrane or proton exchange membrane (PEM) fuel cells have intrinsic benefits and a wide range of applications due to their relatively low operating temperatures (room temperature to approximately 80° C.). The active portion of a PEM is a membrane sandwiched between an anode and a cathode layer. Fuel containing hydrogen is passed over the anode and oxygen (air) is passed over the cathode. The reactants, through the electrolyte (membrane), react indirectly with each other generating an electrical voltage between the cathode and anode. Typical electrical potentials of PEM cells can range from 0.5 to 0.9 volts; the higher the voltage the greater the electrochemical efficiency. However, at higher current densities, the cell voltage is lower and there is eventually a peak value in power density for a given set of operating conditions.

Multiple cells are combined by stacking, interconnecting individual cells in electrical series. The voltage generated by the cell stack is effectively the sum of the individual cell voltages. There are designs that use multiple cells in parallel or in a combination series, parallel configuration. Separator plates (bipolar plates) are inserted between the cells to separate the anode reactant of one cell from the cathode reactant of the next cell. To provide hydrogen to the anode and oxygen to the cathode without mixing, a system of fluid distribution and seals is required.

A number of applications require a wide range of power; for example, the Unmanned Aerial Vehicle (UAV). High powers are required during take-off and climb, with lower average powers for cruise. A typical hybrid fuel cell and battery system would require a DC/DC converter to manage the different voltages from the battery and fuel cell. This is a disadvantage for system weight, volume and efficiency.

With a hybrid fuel cell/battery system, it is also a significant advantage to charge the batteries while in operation when there is available energy from the fuel cell. For this to occur in a safe and reliable manner, the maximum battery charging voltage and current must be carefully controlled. There are several methods to achieve this, but each has its own disadvantages.

For battery charging, one method is to use a buck DC/DC converter which will reduce the stack voltage down to the maximum allowable battery charge voltage. The issue with this approach is that there are losses associated (~90% efficiency), and therefore the stack voltage must be significantly higher than the battery charge voltage to enable battery charging. This means that the battery will be charged only when the stack voltage is very high.

Another method is to use a buck-boost DC/DC converter which will supply the charge voltage at any stack input voltage. The issue with this approach is that when the electrical load requires high power levels, energy from the stack will be supplied directly to the bus through the battery charger, thereby imposing an unnecessary efficiency loss.

Thus, there is a need for improved power management and battery charging for a fuel cell/battery system.

BRIEF SUMMARY

We have discovered that by eliminating a DC/DC converter, a fuel cell stack can be sized to match the voltage/current relationship to that of the battery pack, thereby allowing power to be drawn from the fuel cell up to its rated power, and additional power from the battery over and above this value.

Accordingly, there is provided a circuit for passively managing power between a fuel cell stack and a battery in a hybrid system, the circuit comprising:
a) a buck-boost converter circuit;
b) a direct charge circuit; and
c) a network interconnecting the buck-boost converter, the direct charge, the network being configured such that:
  i) in response to a first voltage level in the network being lower than or equal to a maximum battery charge voltage, the battery is charged via the direct charge circuit; and
  ii) in response to a second voltage level in the network being higher than the maximum battery charge voltage, the battery is charged via the buck-boost converter circuit.

In one example, the circuit further includes:
a) a mode selector; and
b) a current limit circuit; and wherein the network interconnects the buck-boost converter, the direct charge, the mode selector, the current limit circuit and the network is configured such that:
  i) in response to the first voltage level in the network being lower than or equal to the maximum battery charge voltage, the mode selector connects the direct charge circuit to the battery so that the battery is charged; and
  ii) in response to the second voltage level in the network being higher than the maximum battery charge voltage, the mode selector connects the buck-boost converter circuit to the battery so that the battery is charged.

In one example, a voltage comparator controls a switch located in the mode selector to passively switch charging of the battery between the buck-boost converter circuit and the direct charge circuit.

In another example, the current limit circuit is connected to the buck-boost converter circuit and the direct charge circuit to limit current delivered to the battery.

In another example, the network includes a bus which interconnects the fuel cell stack with the battery. The network includes a first diode and a second diode, the first diode being connected to the fuel cell stack, the second diode being connected between the battery and the bus. First and second voltage levels are measured in the bus.

In one example, the battery has low internal resistance.

In another example, the bus has a low voltage limit.

In another example, the circuit further includes an onboard balancing circuit to monitor individual battery voltages.

In another example, the number of fuel cell stack unit cell active area and fuel cell number are characterized by a specific overall voltage and current characteristic which matches the battery's overall voltage and current characteristic and cell number, thereby permitting passive power management between the battery and fuel cell stack depending on the resulting combined voltage and current characteristic of the fuel cell stack and battery.

According to another aspect, there is provided a device for passively managing power, the device comprising:
a) a fuel cell stack;
b) a battery; and
c) the circuit, as described above.

According to another aspect, there is provided a method of passively managing power between a fuel cell stack and a battery in a hybrid system, the method comprising:
i) in response to a first voltage level in a network being lower than or equal to a maximum battery charge voltage, charging a battery via a direct charge circuit; and
ii) in response to a second voltage level in the network being higher than the maximum battery charge voltage, charging the battery via a buck-boost converter circuit.

In one example, the method further includes:
i) in response to the first voltage level in the network being lower than or equal to the maximum battery charge voltage, selectively connecting the battery to the direct charge circuit so that the battery is charged; and
ii) in response to the second voltage level in the network being higher than the maximum battery charge voltage, selectively connecting the battery to the buck-boost converter circuit so that the battery is charged.

In another example, the method further includes limiting current delivered to the battery by connecting either the buck-boost converter circuit or the direct charge circuit to the battery.

In another example, the battery is passively selectively charged.

BRIEF DESCRIPTION OF THE DRAWINGS

These and other features of that described herein will become more apparent from the following description in which reference is made to the appended drawing wherein:

FIG. 1 is a schematic block diagram of a device incorporating a circuit for passively managing a fuel cell/battery hybrid power system.

DETAILED DESCRIPTION

Referring now to FIG. 1, a device for passively managing a fuel cell/hybrid power system is shown generally at 10. The device 10 comprises a fuel cell stack 12 that is electrically connected in a parallel configuration to a battery 26. The battery 26 has low internal resistance.

Still referring to FIG. 1, the device 10 includes a passive control circuit 30 which is connected between the fuel cell stack 12 and the battery 26. The circuit 30 comprises a mode selector 16, a buck-boost DC/DC converter circuit 18, a direct charge circuit 20, and a current limit circuit 22. The mode selector 16 passively selectively electrically connects either the buck-boost converter circuit 18 or the direct charge circuit 20 to the battery 26. A current limit circuit 22 electrically connects the buck-boost converter 18 or the direct charger 20 to the battery 26. The mode selector 16, the buck-boost converter circuit 18, the direct charge circuit 20, and the current limit circuit 22 are electrically interconnected via a network 32. Internal to the mode selector 16, a comparator circuit compares the input voltage to a predetermined set voltage level. The buck-boost converter 18 is a switching power supply which is capable of converting its output voltage to either lower or higher that of the input voltage. It is comprised of switching transistor, inductor, capacitor, diode and a control circuit. The direct charging circuit 20 is comprised of a switching transistor and some other passive components. The mode selector 16 activates the internal switching transistor of the direct charging circuit 20 to allow current flow through this circuit. The current limit circuit 22 is necessary so that the battery is not overcharged. The current limit circuit is comprised of a current shunt resistor, switching transistor and a sense circuit. This circuit senses charge current and when the charge current is higher than predetermined set current, it throttles current path. The network 32 includes a bus 34 which interconnects the fuel cell stack 12 to the circuit 30 and the battery 26. Two diodes 14 and 24 are connected respectively to the fuel cell stack 12 and the battery 26 to protect them from reverse (back-feed) current and uncontrolled battery charging. The circuit 30 may also include an onboard balancing circuit (not shown) to monitor individual battery voltages.

Load 28 is connected to the fuel cell stack 12 and the battery 26, via the bus 34 with electrical management to the load 28 being determined passively as will be described below.

Referring still to FIG. 1, electrical power management to load 28 from the fuel cell stack 12 and the battery 26 is determined passively by matching the fuel cell stack's 12 voltage and current relationship to that of the battery 26, thereby allowing power to be drawn from the fuel cell stack 12 up to its rated power, with additional power being supplied from the battery 26 at power levels above this value. This power management strategy also depends on the battery 26 state-of-charge (SOC), which determines the battery's 26 resulting voltage for a given electrical current. The battery 26 is charged by two methods, passive selection of which depends on the voltage of the fuel cell stack 12, which directly determines the electrical bus 34 voltage when the fuel stack's 12 voltage is higher than the battery 26 voltage. When the bus 34 voltage level is lower than the maximum recommended battery charge voltage, the battery 26 is charged via the direct charge circuit 20, thereby coupling the electrical bus 34 directly to the battery 26. The battery 26 charge current is determined by the difference between the electrical bus 34 voltage and the battery 26 voltage, the battery's 26 internal resistance, where the maximum charge current is limited by the current limit circuit 22. If the bus 34 voltage level equals the battery 26 voltage, no charging will occur. Conversely, when the bus 34 voltage level is higher than the maximum recommended battery 26 charge voltage, the battery 26 is charged via the buck-boost converter charging circuit 18, whose output voltage is set to the maximum recommended battery charge voltage. The maximum charge current is limited via current limit circuit 22. As previously described, a switch inside the mode selector circuit 16 is controlled via a voltage comparator, which passively switches between the direct charge circuit 20 and the buck-boost charge circuit 18 depending on the bus 34 voltage level. The bus 34 has a low voltage limit on the electrical bus load output, thereby reducing output power levels when this low voltage limit is reached in order to protect the stack from overload when the battery state-of-charge (SOC) is low.

By omitting the conventionally used DC/DC converter for power management to the electrical load 28, we have reduced the overall system mass and correspondingly improved system efficiency. Furthermore, we have increased the efficiency and safety of battery charging over the full stack voltage range and have reduced system complexity as a result of the passive power management and battery charging circuit. Due to its decreased weight, volume and complexity, the device 10 can be used in fuel cell/battery hybrid power generation applications, such as for example, in Unmanned Aerial Vehicle (UAV) applications.

When the fuel cell stack 12 provides a voltage at or below the required battery charging voltage, it is effectively connected directly to the battery 26. The current limit circuit 22 is integrated into the circuit 34 to regulate the maximum current. This allows the fuel cell stack 12 to charge the battery 26 at any time when the battery 26 voltage is lower than the fuel cell stack 12 voltage, until it reaches the maximum recommend charging voltage. When the fuel cell stack 12 provides the bus 34 with voltage that is higher than the maximum recommended charging voltage, the buck-boost DC/DC converter 18 is used to provide the recommended charging voltage. The buck-boost converter 18 eliminates the "dead zone" associated with the buck only charging method. The voltage comparator is used to switch between the direct and buck-boost charging methods. Thus, the direct-buck-boost charging strategy therefore allows the battery 26 to be charged over the full stack voltage range when the battery 26 voltage is below its maximum recommended charging voltage, and when there is available energy from the fuel cell stack 12.

Moreover, the fuel cell stack unit cell is sized in a way (i.e. active area) to provide the desired current and voltage characteristic of the cell. The number of fuel cells is then chosen to provide the overall voltage characteristic of the stack. This is then matched with the voltage and current characteristic, as well as the number of cells, of the battery. Therefore, as long as the stack voltage is higher than that of the battery, power will be supplied from the stack. As increasing power is drawn, the voltage of the stack drops down to meet the battery voltage, and then the power sharing between the stack and battery depends on the corresponding voltage/current characteristics in that region of their operation. Thus, the battery tends to have a "stiffer" voltage which acts as a safety net for the stack, so the stack is not overloaded.

Operation

Still referring to FIG. 1, the network 32 is configured so that in response to a first voltage level in the network 32 which is lower than a maximum battery charge voltage, the battery 26 is charged via the direct charge circuit 20. Similarly, in response to a second voltage level in the network 32 being higher than the maximum battery charge voltage, the battery 26 is charged via the buck-boost converter circuit 18. Also, in response to the first voltage level in the network 32 being lower than or equal to the maximum battery charge voltage, the mode selector 16 passively connects the battery 26 to the direct charge circuit 18 so that the battery 26 is charged; and in response to the second voltage level in the network 32 being higher than the maximum battery charge voltage, the mode selector 16 passively connects the battery 26 to the buck-boost converter circuit 18 so that the battery 26 is charged.

OTHER EMBODIMENTS

From the foregoing description, it will be apparent to one of ordinary skill in the art that variations and modifications may be made to the embodiments described herein to adapt it to various usages and conditions.

We claim:

1. A circuit for passively managing power between a fuel cell stack and a battery in a hybrid system, the circuit comprising:
a) a buck-boost converter circuit;
b) a direct charge circuit; and
c) a network interconnecting the buck-boost converter, the direct charge, the network being configured such that:
  i) in response to a first voltage level in the network being lower than or equal to a maximum battery charge voltage, the battery is charged via the direct charge circuit; and
  ii) in response to a second voltage level in the network being higher than the maximum battery charge voltage, the battery is charged via the buck-boost converter circuit.

2. The circuit, according to claim 1, further includes:
a) a mode selector; and
b) a current limit circuit; and wherein the network interconnects the buck-boost converter, the direct charge, the mode selector, the current limit circuit and the network is configured such that:
  i) in response to the first voltage level in the network being lower than or equal to the maximum battery charge voltage, the mode selector connects the direct charge circuit to the battery so that the battery is charged; and
  ii) in response to the second voltage level in the network being higher than the maximum battery charge voltage, the mode selector connects the buck-boost converter circuit to the battery so that the battery is charged.

3. The circuit, according to claim 2, in which a voltage comparator controls a switch located in the mode selector to passively switch charging of the battery between the buck-boost converter circuit and the direct charge circuit.

4. The circuit, according to claim 1, in which the current limit circuit is connected to the buck-boost converter circuit and the direct charge circuit to limit current delivered to the battery.

5. The circuit, according to claim 1, in which the network includes a bus which interconnects the fuel cell stack with the battery.

6. The circuit, according to claim 5, in which the network includes a first diode and a second diode, the first diode being connected to the fuel cell stack, the second diode being connected between the battery and the bus.

7. The circuit, according to claim 5, in which first and second voltage levels are measured in the bus.

8. The circuit, according to claim 1, in which the battery has low internal resistance.

9. The circuit, according to claim 1, in which the bus has a low voltage limit.

10. The circuit, according to claim 1, further includes an onboard balancing circuit to monitor individual battery voltages.

11. The circuit according to claim 1, in which the number of fuel cell stack unit cell active area and fuel cell number are characterized by a specific overall voltage and current characteristic which matches the battery's overall voltage and current characteristic and cell number, thereby permitting passive power management between the battery and fuel cell stack depending on the resulting combined voltage and current characteristic of the fuel cell stack and battery.

12. A device for passively managing power, the device comprising:
a) a fuel cell stack;
b) a battery; and
c) the circuit, according to claim 1.

13. A method of passively managing power between a fuel cell stack and a battery in a hybrid system, the method comprising:

i) in response to a first voltage level in a network being lower than or equal to a maximum battery charge voltage, charging a battery via a direct charge circuit; and
ii) in response to a second voltage level in the network being higher than the maximum battery charge voltage, charging the battery via a buck-boost converter circuit.

14. The method, according to claim 13, further includes:
i) in response to the first voltage level in the network being lower than or equal to the maximum battery charge voltage, selectively connecting the battery to the direct charge circuit so that the battery is charged; and
ii) in response to the second voltage level in the network being higher than the maximum battery charge voltage, selectively connecting the battery to the buck-boost converter circuit so that the battery is charged.

15. The method, according to claim 14, further includes limiting current delivered to the battery by connecting either the buck-boost converter circuit or the direct charge circuit to the battery.

16. The method, according to claim 13, in which the battery is passively selectively charged.

\* \* \* \* \*